US011757660B2

(12) United States Patent
Bacca et al.

(10) Patent No.: US 11,757,660 B2
(45) Date of Patent: Sep. 12, 2023

(54) SECURITY GOVERNANCE OF THE PROCESSING OF A DIGITAL REQUEST

(71) Applicant: LEDGER, SAS, Paris (FR)

(72) Inventors: Nicolas Bacca, Paris (FR); Olivier Tomaz, Orsay (FR)

(73) Assignee: LEDGER, SAS, Paris (FR)

( * ) Notice: Subject to any disclaimer, the term of this patent is extended or adjusted under 35 U.S.C. 154(b) by 0 days.

(21) Appl. No.: 17/259,113

(22) PCT Filed: Jul. 11, 2019

(86) PCT No.: PCT/FR2019/000113
§ 371 (c)(1),
(2) Date: Jan. 8, 2021

(87) PCT Pub. No.: WO2020/012079
PCT Pub. Date: Jan. 16, 2020

(65) Prior Publication Data
US 2021/0306162 A1 Sep. 30, 2021

(30) Foreign Application Priority Data
Jul. 11, 2018 (FR) ...................................... 1870826

(51) Int. Cl.
*H04L 9/32* (2006.01)
*H04L 9/40* (2022.01)

(52) U.S. Cl.
CPC ........ *H04L 9/3268* (2013.01); *H04L 63/0442* (2013.01)

(58) Field of Classification Search
CPC ... H04L 9/3268; H04L 63/0442; H04L 29/06; H04L 9/32; H04L 9/08; H04L 9/3255;
(Continued)

(56) References Cited

U.S. PATENT DOCUMENTS

| 5,815,573 A | 9/1998 | Johnson et al. |
| 6,182,214 B1 | 1/2001 | Hardjono |
| (Continued) | | |

FOREIGN PATENT DOCUMENTS

| WO | 1995/05712 A1 | 2/1995 |
| WO | 2003/077470 A1 | 9/2003 |
| (Continued) | | |

OTHER PUBLICATIONS

International Search Report dated Aug. 23, 2019, issued in PCT Application No. PCT/FR2019/000113, filed Jul. 11, 2019.

*Primary Examiner* — Techane Gergiso
(74) *Attorney, Agent, or Firm* — Workman Nydegger

(57) ABSTRACT

Disclosed is a method for validating a digital request in which cooperating entities are able to use security processors loaded with an application for processing the request, each processor issuing, on request, a digital certificate of integrity; wherein said method includes: an application integrity verification process such that, based on the issued certificates, each entity ensures that each of the other entities implements an application identical to its own; a process by which entities create a common secret and thus form a group of Creative entities; and a process by which entities of the group of Creative entities designate the signatory entities, thus forming a group of cooperating signatory entities, so that, as such, the group has access to the common secret; in order for the request to be validated if and only if entities of the group of signatory entities implement the application by means of the common secret.

10 Claims, 8 Drawing Sheets

(58) Field of Classification Search
CPC ... H04L 9/3263; H04L 9/0825; H04L 9/3247; H04L 9/3249; H04L 9/3252; H04L 9/3257; H04L 9/3236; H04L 9/3242; H04L 9/3239; H04L 9/0847; H04L 9/0841; H04L 9/0838; H04L 9/0844; G06F 21/64; G06F 21/60; G06F 21/34; G06F 21/33; H04W 12/069
See application file for complete search history.

(56) References Cited

U.S. PATENT DOCUMENTS

| | | | | |
|---|---|---|---|---|
| 10,129,223 | B1* | 11/2018 | Bhattacharyya | H04L 63/061 |
| 10,516,543 | B2* | 12/2019 | Campagna | H04L 9/321 |
| 2003/0012382 | A1* | 1/2003 | Ferchichi | H04L 67/04 |
| | | | | 380/270 |
| 2008/0130895 | A1* | 6/2008 | Jueneman | H04L 9/3252 |
| | | | | 380/277 |
| 2008/0263363 | A1* | 10/2008 | Jueneman | H04L 9/0877 |
| | | | | 713/184 |
| 2011/0131406 | A1* | 6/2011 | Jones | G06F 12/1408 |
| | | | | 713/150 |
| 2014/0189359 | A1* | 7/2014 | Marien | H04L 9/3228 |
| | | | | 713/172 |
| 2015/0003615 | A1* | 1/2015 | Vanstone | H04L 9/0847 |
| | | | | 380/282 |
| 2015/0229480 | A1 | 8/2015 | Joye et al. | |
| 2016/0006566 | A1* | 1/2016 | Morgner | H04L 9/0866 |
| | | | | 713/185 |
| 2016/0218875 | A1* | 7/2016 | Le Saint | H04L 9/0861 |
| 2016/0269393 | A1* | 9/2016 | Corella | G06F 21/33 |
| 2016/0373418 | A1* | 12/2016 | Stahl | H04W 12/04 |
| 2017/0272944 | A1* | 9/2017 | Link, II | H04L 9/0841 |
| 2017/0338958 | A1* | 11/2017 | Medvinsky | H04L 9/3263 |
| 2017/0373844 | A1* | 12/2017 | Sykora | H04L 9/0877 |
| 2018/0007037 | A1* | 1/2018 | Reese | H04L 9/3297 |
| 2019/0372759 | A1* | 12/2019 | Rix | H04L 9/0844 |

FOREIGN PATENT DOCUMENTS

| | | |
|---|---|---|
| WO | 2015/118160 A1 | 8/2015 |
| WO | 2015/160839 A1 | 10/2015 |
| WO | 2016/130030 A1 | 8/2016 |
| WO | 2017/064124 A1 | 4/2017 |
| WO | 2017/145010 A1 | 8/2017 |
| WO | 2017/145016 A1 | 8/2017 |

* cited by examiner

SECURITY GOVERNANCE OF THE PROCESSING OF A DIGITAL REQUEST

BACKGROUND OF THE INVENTION

1. The Field of the Invention

The invention relates to the security governance of the processing of a digital request and to a method for validating a digital request by a requesting entity, a method for processing a digital request implementing this digital request validation method, applications of this method for validating a digital request and a system for implementing this method for validating a digital request, including at least two security processors.

2. The Relevant Technology

The expression "security governance of the processing of a digital request" must be considered in its broadest generic sense, so as to include, in particular but not exclusively, an electronic signature governance process, a data encryption and decryption of data governance process, an electronic voting process, a governance process for banking or electronic payment transactions.

Security governance must be understood as representative of the processes used to verify the compliance of the digital request from a requesting entity, with the body of rules jointly defined by cooperating entities implementing security processors responsible for an application. The expression "cooperating entity" should therefore be understood as being a person or a computer robot capable of using an application on a security processor. The term "requesting entity" should be understood as meaning the entity making the digital request. The expression "digital request" should be understood as meaning a message sent to electronic and computer means cooperating to provide a service and including a system for the implementation of this method for validating a digital request. Such a service may be, in particular but not exclusively, encryption or a decryption of data, an electronic vote, a banking or electronic payment transaction.

The expression "security processor" should be understood as meaning an electronic support device for applications implementing confidential data, and comprising a persistent memory, a volatile memory, a computer capable of performing cryptographic functions and, in particular, capable of authenticating all or part of the contents of his memories by providing what is referred to here as a "digital certificate". The processor is qualified as a security processor insofar as the contents of the memories can only be modified with authentication on the device.

The term "application", relating to the application loaded into a memory of such a security processor, should be understood to mean the set of rules executed on the confidential data and parameters (including at least a process for creating a secret).

Document U.S. Pat. No. 5,815,573 describes a method for generating a cryptographic key to be used by a pair of communicating parties, providing for the recovery of said key using a plurality of cooperating key recovery agents, comprising the following steps: the generation of a plurality of shared key parts which are shared with the respective key recovery agents; the generation of an unshared key part which is not shared with key recovery agents; generation of said key based on said shared key parts and said unshared key part; and making the respective parts of said shared key parts available to said key recovery agents to facilitate said recovery of said key using said key recovery agents.

Documents WO 2017/064124, WO03077470 and WO9505712, among others, describe methods for generating a common secret.

Document WO 2017/145016 describes a method and a system for determining a common secret for two nodes. Each node has a respective asymmetric cryptographic pair, each pair comprising a master private key and a master public key. Respective second private and public keys may be determined based on the master private key, the master public key and a deterministic key. A common secret can be determined at each of the nodes as a function of the second private and public keys. In one example, a node may determine the common secret as a function of: a second private key based on the node's proprietary master private key and the deterministic key; a second public key based on the master public key of the other node and the deterministic key. This method and system can be adapted to digital wallets, blockchain technologies and security for personal devices. With this method and this system a common secret is never shared.

WO 2017/145010 describes a computer-implemented method for controlling access to a computing resource such as, for example, a digital wallet. In one or more embodiments, the wallet can be implemented using a blockchain. Performing the method during the initial wallet setup may allow subsequent operations, such as wallet transactions, to be handled in a secure manner over an unsecured channel, such as the Internet. One method, according to one embodiment, may comprise the steps of dividing a verification element (such as a private key in an asymmetric cryptographic pair) into a plurality of parts; determining a shared secret at two or more nodes of a network; and using the shared secret to transmit at least part of the verification element between the two nodes. The parts can be divided such that no single part is sufficient to obtain the verification element. This means that no one part stores the entire private key, which improves key security. At least two parts are needed to restore the key. The parts are stored in separate locations, one of which is an independent backup or secure storage location. If one of the other parts becomes unavailable, the part can be retrieved from the backup to ensure that the key (and therefore the resource ordered) is still accessible. To ensure secure transmission of said parts, the shared secret is generated at two different nodes independently of each other, and then used to generate an encryption key. The encryption key can be used to encrypt at least one part of the verification element, or a message comprising it, to ensure that said parts are transmitted in a secure manner. This process does not involve the creation and sharing of a common secret. Furthermore, the processor is not a security processor as previously defined.

WO 2016/130030 describes a method for protecting data using threshold cryptography, in which data are encrypted using cryptographic algorithms and a cryptographic key is divided into different parts. The data protection method using threshold cryptography is characterised in that a unique identifier is assigned to encrypted data. Subsequently, at least one part of the cryptographic key is merged with encrypted data. Then, the encrypted data merged with some of the key parts is split into fragments and a unique identifier previously assigned to the encrypted data is added to each fragment. The same unique identifier is added to the part of each key that has not been merged with encrypted data. The resulting data fragments are deployed on physically separate devices comprising at least one processor and one non-volatile memory, and, for each fragment, information about the device to which it is deployed is saved. The parts of the key that have not been merged with encrypted data are placed on physically separate devices comprising at least one processor and one non-volatile memory, and, for each part of the key, information about the device on which it is stored are saved. This patent is focused on confidentiality, not authentication.

In U.S. Pat. No. 6,182,214, threshold cryptography (secret sharing) is used to exchange a secret between a server and a client over an untrusted network. Specifically, a secret is computationally split into N shares using a threshold cryptography scheme, such that any M of the shares (M being less than or equal to N) can be used to reconstruct the secret. The N shares are distributed over a certain number of transmitted messages, assuming that a certain number of messages comprising a total of at least M actions will be received by the client. When receiving at least M shares, the client uses at least M shares to reconstruct the secret using the threshold cryptography scheme. This patent is focused on confidentiality in the transfer of a secret, not authentication.

A security governance system is known in which a requesting entity sends a request to a system including a security processor, the execution of which is conditioned by final consent being given to said security processor by people or computer robots that have been previously authorised by an external authority playing the role of a trusted third party.

One weakness of such governance is the persistent centralisation of confidential data in said security processor. And that people or computer robots cannot certify, without a trusted third party, that confidential data will not be used other than for consent purposes. Furthermore, such governance is constrained by having to resort to a trusted third party and to rigid and complex authorisation processes.

Such is the context of the invention and such is the interpretation of the terms used throughout the text.

The problem underlying the invention is the validation of a digital request from a requesting entity and, ultimately, the ability to process said digital request by subjecting it to the prior consent of several entities, without having to resort to a trusted third party.

SUMMARY OF THE INVENTION

The solution to this problem is for the cooperating entities to consent to the execution of the request by implementing threshold cryptography technologies, while these cooperating entities authenticate each other using the digital certificates provided by a plurality of security processors.

The following is a description of the invention.

According to a first aspect, the object of the invention is a method for validating a digital request:
in which a plurality of cooperating entities are each able to implement a security processor loaded with the same application required to process said request, each security processor being able deliver a digital integrity certificate for said application on request,
which includes a process for verifying the integrity of said application such that, based on the digital certificates issued by each security processor, each entity of the plurality of cooperating entities ensures that each of the other entities in the plurality of entities implements an application identical to its own, by cryptographically verifying the corresponding digital certificate,
which includes a process whereby cooperating entities create a common secret and therefore constitute a college of cooperating creative entities,
which comprises, by means of the implementation of the integrity verification process in said application, a process whereby the entities of the college of cooperating creative entities designate the cooperating signatory entities, so constituting a college of cooperating signatory entities, such that said college of cooperating signatory entities, taken as such, has access to the common secret,
such that said request is validated if, and only if, cooperating entities of the college of cooperating signatory entities implement said application by means of the common secret.

According to the embodiments, such a security processor is able to be implemented either by a cooperating entity, in which case said security processor is specific to that cooperating entity, or by several cooperating entities, in which case said security processor is common to those cooperating entities, the method involving the implementation of at least two security processors.

According to one characteristic, for each security processor to issue a digital integrity certificate on request:
selected security processors are implemented such that they each have their own first pair of asymmetric cryptographic keys,
at the request of one or more cooperating entities, each security processor uses the private key of said first pair of keys to generate an electronic signature for all or part of the contents of its memories,
said electronic signature serves as a digital integrity certificate for the corresponding signed content and its authenticity can be verified using the public part of said first pair of keys.

According to one characteristic, with a view to verifying the integrity of said application,
the cooperating entities of said plurality of cooperating entities all agree on a second pair of asymmetric cryptographic keys,
the private part of said second pair of keys is used to generate the electronic signature for the public part of said first pairs of keys for each security processor,
such that said cooperating entities are able to authenticate, by implementing the public part of said second pair of keys, the digital integrity certificates issued by each of the security processors.

According to the embodiments, in order to agree on said second pair of asymmetric cryptographic keys, the cooperating entities use a pair of asymmetric cryptographic keys drawn at random and shared between them, said second pair of asymmetric cryptographic keys may also be provided by an external certification authority.

According to one characteristic, to create a common secret:
cooperating entities from the plurality of cooperating entities pool their proprietary confidential data,
digital processing is applied to all of said proprietary confidential data, so creating said common secret.

According to the embodiments, said proprietary confidential data are drawn at random by each of the cooperating entities, and/or introduced by the cooperating entities into the memory of the associated security processors, and/or extracted from the memory of the associated security processors.

According to one characteristic, by means of a splitting/reconstruction algorithm, the common secret is able to be split into separate parts so as to be reconstructed later on, and/or in which at least some or all of the split parts are suitable and sufficient to be able to reconstruct said common secret later on.

According to one embodiment:
once created, said common secret is split into a number of creative separate parts, equal in number to the number of cooperative creative entities,
and said creative split parts are distributed among the cooperative creative entities, each of said entities retaining one of said creative split parts,
such that subsequently, said common secret can be reconstructed using at least some of, or all of, said creative separate parts.

According to one possibility, said common secret can only be used for the validation of one, and only one, digital request and cannot be stored persistently in any of the memories of the associated security processors.

According to a first possible embodiment, during implementation of the validation method, a process for verifying the integrity of said application is provided such that, using the digital certificates issued by each security processor, each entity of the plurality of cooperating entities individually ensures that each of the other entities of the plurality of entities implements an application identical to its own by cryptographically verifying the corresponding digital certificate.

According to a second possible embodiment, during the implementation of the validation method, a process verifies the integrity of said application such that, using the digital certificates issued by each security processor, each entity of the plurality of cooperating entities ensures that each of the other entities of the plurality of entities implements an application identical to its own by cryptographically verifying the corresponding digital certificate, indirectly and by transitivity, by ensuring that a certain entity of the plurality of entities implements an application identical to its own by cryptographically verifying the corresponding digital certificate, said entity having itself ensured that the other entities of the plurality of entities are implementing the same application.

According to one characteristic, said proprietary confidential data is transmitted confidentially by means of an encryption and decryption algorithm, between the cooperating creative entities using at least one session key, said session key or keys being rendered unusable after the creation of a common secret.

According to one embodiment:
The cooperating creative entities include a primary controller creative entity and the other cooperating creative entities,
a plurality of session keys are used, such that each cooperating creative entity uses its proprietary key to communicate confidentially, by means of an encryption and decryption algorithm, with said primary controller creative entity,
said application incorporates an algorithm for exchanging session keys,
said primary controller creative entity initiates said session key exchange algorithm with each of the other cooperating creative entities,
such that said other cooperating creative entities send, in a confidential manner using their proprietary session keys, by means of a one-time encryption and decryption algorithm, their proprietary confidential data to said primary controller creative entity,
as the process is repeated, each cooperative creative entity becomes the primary controller creative entity,
such that the cooperating creative entities are able to apply digital processing to all of said proprietary confidential data, so creating said common secret.

According to one embodiment:
the cooperating creative entities include a second controller creative entity and the other cooperating creative entities,
a plurality of session keys are used, such that each cooperating signatory entity uses its proprietary key to communicate, confidentially, by means of an encryption and decryption algorithm, with said secondary controller creative entity,
a plurality of session keys are used, such that each cooperating creative entity uses its proprietary key to communicate, confidentially, by means of an encryption and decryption algorithm, with said secondary controller creative entity,
said secondary controller creative entity implements a process for verifying the integrity of
said application, executed by the security processor of each cooperating signatory entity, such that said secondary controller creative entity ensures that each of the cooperating signatory entities implements an application identical to its own, by cryptographically verifying the corresponding digital certificate,
said application incorporates an algorithm for exchanging session keys,
said session key exchange algorithm is initiated between, on the one hand, each of said other cooperating creative entities and each of the cooperating signatory entities and, on the other, said secondary controller creative entity, such that:
all, or at least some—in sufficient number for reconstruction of the common secret
of said other cooperating creative entities transmit, in a confidential manner using their proprietary session keys, by means of a one-time encryption and decryption algorithm, their creative separate parts resulting from the same splitting of the common secret, to said secondary controller creative entity,
said secondary controller creative entity reconstructs the common secret,
said secondary controller creative entity splits the common secret into a number of separate signatory parts equal to the number of cooperating signatory entities,
said secondary controller creative entity transmits, in a confidential manner using the session keys, by means of a one-time encryption and decryption algorithm, their split signatory parts of the common secret to said cooperating signatory entities.

According to one embodiment, the separate parts resulting from the same splitting of the common secret are transmitted confidentially, by means of an encryption and decryption algorithm, between the cooperating entities using at least one session key, said session key or keys being rendered unusable after the reconstruction of said common secret.

According to one embodiment:
the cooperating entities include a controller entity and the other cooperating entities,
a plurality of session keys are used, such that each cooperating entity uses its proprietary key to communicate confidentially, using an encryption and decryption algorithm, with said controller entity, said application incorporates an algorithm for exchanging session keys, if said controller entity initiates said session key exchange algorithm with each of the other cooperating entities, such that all, or at least some—in sufficient number for the reconstruct of the common secret—of said other cooperating entities transmit, confidentially, using their proprietary session keys, by means of a one-time encryption and decryption algorithm, said separate parts resulting from the same splitting of the common secret, to said controller entity.

Depending on the case, the college of cooperating creative entities and the college of cooperating signatory entities are separate, or the college of cooperating creative entities and the college of cooperating signatory entities are at least partially common.

According to a second aspect, the invention relates to a method for processing a digital request from a requesting entity, with a plurality of cooperating entities which are each capable of implementing a security processor loaded with a single application required for processing said request, each security processor being able to deliver a digital integrity certificate on request, which implements the method for validating a digital request as described above, such that said request is processed if, and only if, cooperating entities of the college of cooperating signatory entities implement said application using the common secret.

According to one characteristic:
the requesting entity transmits said digital request, on the one hand, to the college of cooperating entities and, on the other, to an electronic means capable of executing said request,
the college of cooperating entities implements a validation process using said common secret, with a view to validating said digital request,
said electronic means executes said digital request based on said validation.

According to a third aspect, the invention relates to the application of the method for validating a digital request, as described above, to a method for processing a digital request from a requesting entity as described above, or, in particular, an electronic signature governance process, a data encryption and decryption governance process, an electronic voting process, a banking or electronic payment transaction governance process.

According to a fourth aspect, the invention relates to a system for implementing the method for validating a digital request as described above, which comprises:
at least two security processors running an application for processing said request, implementing confidential data and comprising a persistent memory, a volatile memory, a computer capable of performing cryptographic functions and, in particular, of authenticating all or part the contents of its memories by providing a digital integrity certificate on request, such that a plurality of cooperating entities are each able to implement one of said security processors, and the contents of whose memories can only be modified with authentication,
a means capable of creating a common secret,
a digital certification algorithm,
an encryption and decryption algorithm,
an algorithm for splitting/reconstruction the common secret,
an algorithm for exchanging session keys,
means of communication between the security processors and the entities.

BRIEF DESCRIPTION OF THE DRAWINGS

The figures are briefly described here.

In addition.

DETAILED DESCRIPTION OF THE PREFERRED EMBODIMENTS

Figure 1:
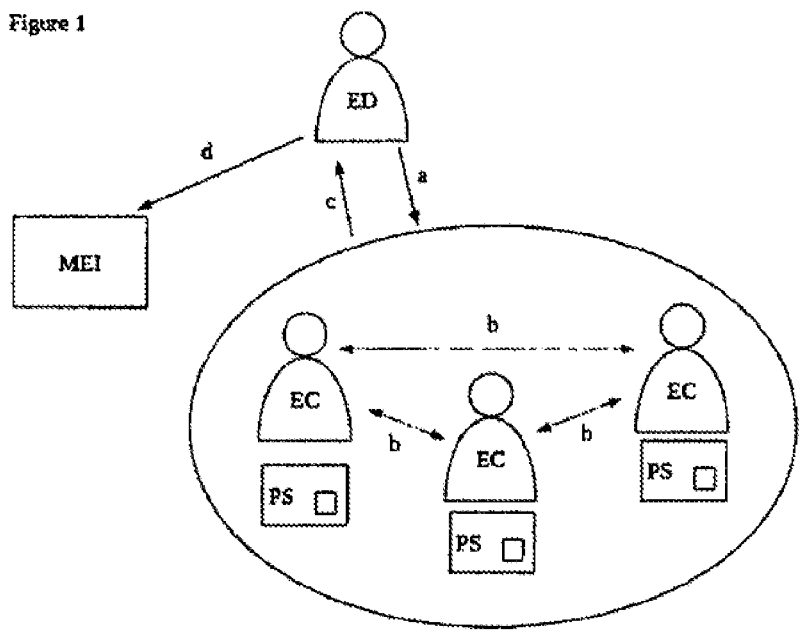
FIG. 1 is a simplified diagram illustrating a possible embodiment of a method for processing a digital request implementing a method for validating the request. The figure illustrates one requesting entity, three cooperating entities, three security processors, and an electronic and computer means capable of and intended to execute the request. The arrows symbolise the operations performed.

Following are detailed descriptions of the embodiments of the invention and different embodiments, together with examples and references to the figures. This disclosure is to be understood in the context of the invention and with interpretation of the terms as set out above.

In one possible application, a method for validating a digital request RN, according to the invention, is applied to a method for processing a digital request RN from a requesting entity ED.

As has been explained, the security governance of the processing of a digital request RN must be considered in its broadest and generic sense, so as to include, in particular but not exclusively, an electronic signature governance process, a data encryption and decryption governance process, an electronic voting process, a governance process for banking or electronic payment transactions.

The requesting entity ED is a person or a computer robot who is able to make or carry out the digital request RN and who, in practice, makes or carries out said digital request RN.

The digital request RN is a message addressed to an appropriate electronic and computer means MEI. In the possible embodiments, such a digital request RN and such electronic and computer means MEI are an Internet form on a server, filled in by the requesting entity ED.

In the remainder of the text, the method for validating a digital request RN is sometimes shortened to the validation method and, by analogy, the method for processing a digital request RN is sometimes shortened to the processing method.

The validation method implements a validation system SV which comprises at least two security processors PS running an application AP necessary for processing the request RN, which is therefore appropriate for this purpose, and implementing confidential data DC. Such a security processor PS comprises a persistent memory, a volatile memory, a computer capable of performing cryptographic functions and, in particular, of authenticating all or part of the contents of its memories by providing a digital integrity certificate AN on request. The application AP is loaded into a memory of such a security processor PS and expresses the set of executed rules with confidential data DC and parameters. In this case, the application AP includes at least one common secret SC creation process.

The validation process involves a plurality (at least two) of cooperating entities EC, which are suitable and intended to implement one security processor PS each.

The contents of the memories of the security processors PS can only be changed with authentication, which qualifies the processors PS as "security" processors.

The validation system SV further comprises means capable of and intended to create a common secret SC, a digital certification algorithm, an encryption and decryption algorithm ALCD, an algorithm for splitting/reconstructing a common secret SC, ALDE/ALRE, an algorithm for exchanging session keys ALEC, and means of communication between the security processors PS and the entities EC, ED.

The means comprising the validation system SV, whose functions and results are described below, may be the subject of various embodiments, either known or achievable by those skilled in the art, as well as equivalent embodiments for performing the same functions and providing identical or similar results.

In one possible embodiment, a security processor PS is a smart card, for example.

In possible embodiments, a means capable of and intended to create a common secret SC, is based on an exclusive OR function (often called XOR); a digital certification algorithm is an ECDSA algorithm (EUiptic Curve Digital Signature Algorithm); an encryption and decryption algorithm is an AES algorithm (Advanced Encryption Standard); a common secret splitting/reconstruction algorithm SC is an SSS algorithm (Shamir's Secret Sharing); a session key exchange algorithm is an SCDH algorithm (Elliptic Curve Diffie-Hellman), the means of communication between the security processors PS and the entities EC, ED are telematic links.

These embodiments only provided for illustration purposes. They are not exhaustive.

The processing method implements the validation method discussed previously, such that the request RN is processed if, and only if, the cooperating entities EC of a college of cooperating signatory entities COECS described below, implement the application AP by means of a common secret, also described below. To do this, the requesting entity ED sends the request RN to the college of cooperating entities COEC, and also to an electronic and computer means MEI, designed and selected so as to be suitable and intended to execute the request RN. The college of cooperating entities implements a validation method using said common secret with a view to validating said digital request. The electronic and computer means MEI then executes the request RN depending on validation.

"College of entities" means several entities (at least two) having the common characteristic of contributing to the same given process, such as, in particular, an integrity verification method or a method for creating a common secret, as described below.

The electronic and computer means MEI may be the subject of various embodiments, known or achievable by those skilled in the art, depending on the request RN, the corresponding service, and the environment in which the processing method for the RN request takes place.

In possible embodiments, an electronic and computer means MEI is a computer, whatever its form.

The validation method provides security governance, insofar as this leads to checking that the digital request RN complies with the body of rules defined jointly by the cooperating entities EC, which is done by implementing the security processors PS loaded with the application AP.

Each cooperating entity EC is a person or a computer robot able to use the application AP.

The processing method including the validation method is illustrated in a simplified manner in FIG. 1, which schematically represents the requesting entity ED, a plurality of cooperating entities EC, comprising three entities in this case, three security processors PS, one for each cooperating entity EC, the three cooperating entities EC and the three security processors PS forming a type of "block" comprising a college of cooperating entities that are signatories COECS and their associated security processors PS, and the electronic and computer means MEI capable of and intended to execute the request RN. The reference arrow a symbolises the request for validation of the request RN by the requesting entity ED to the "block". Reference arrows b symbolise the process for validating the request RN from the requesting entity ED to the "block", by means of a process for reconstructing the common secret SC. The reference arrow c symbolises the validation result sent by the "block" to the requesting entity ED, and reference d symbolises the validated request sent to the electronic and computer means MEI.

More precisely, the validation method is such that a plurality (at least two) of cooperating entities EC are each able to implement a security processor PS loaded with the same application AP, for which each security processor PS provides a digital integrity certificate on request.

As such, the digital request RN is validated and ultimately processed by subjecting it to prior consent by several entities, without having to resort to a trusted third party. Indeed, the cooperating entities EC consent to the execution of the digital request RN through the implementation of threshold cryptography technologies, while these cooperating entities EC will mutually authenticate each other using the digital certificates AN issued by the security processors PS.

Figure 2:
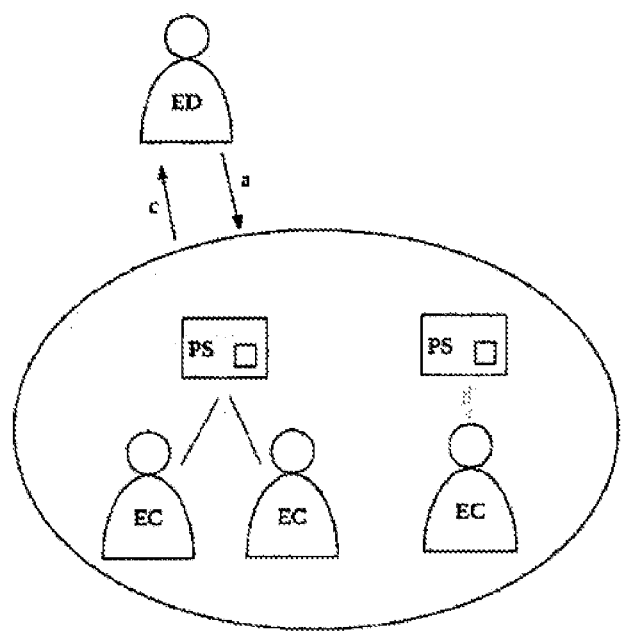
FIG. 2 is a simplified diagram which illustrates two possible embodiments relating to security processors and cooperating entities, namely an embodiment in which the security processor is specific to a cooperating entity, and an embodiment in which the security processor is common to several cooperating entities.

Reference is now made to FIG. 2 which repeats part of FIG. 1 and illustrates two possible embodiments with regard to the security processors PS and the cooperating entities EC. In a first embodiment (right-hand part of FIG. 2), the security processor PS is specific to a cooperating entity EC. In a second embodiment (left-hand part of FIG. 2), the security processor PS is common to several cooperating entities. In all cases, the validation process involves the implementation of at least two security processors PS.

The validation method includes a process for verifying the integrity of the application AP such that, based on the digital certificates AN issued by each security processor PS, each entity EC of the plurality of cooperating entities EC ensures that each of the other entities EC of the plurality of entities EC implements an application AP which is identical to its own, by cryptographically verifying the corresponding digital certificate AN.

Figure 3:
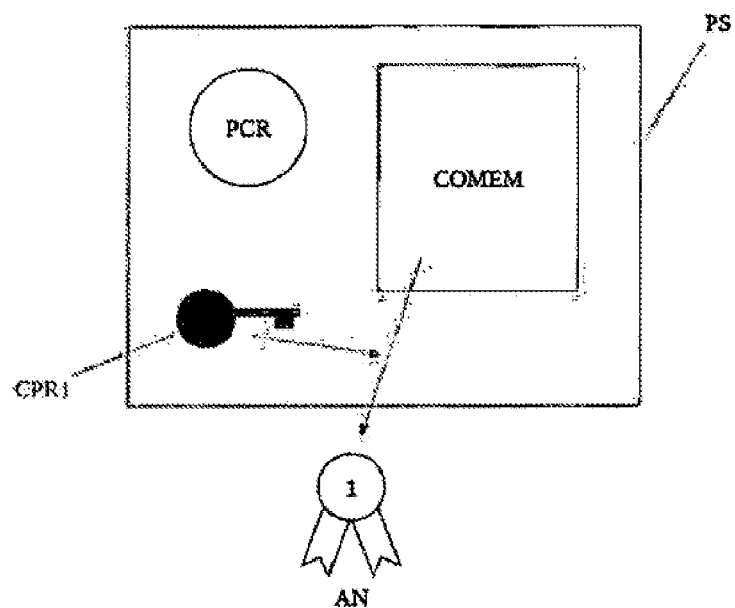
FIG. 3 is a simplified diagram illustrating an example of a process for verifying the integrity of the implemented application using a cryptographic process with asymmetric cryptographic keys.

For this purpose, and in one embodiment (see diagram in FIG. 3), by implementing a cryptographic process PCR, security processors PS are chosen such that they each have their own first pair of asymmetric cryptographic keys CC1. At the request of one or more cooperating entities EC, each security processor PS uses the private key CPR1 of the first pair of keys CC1 to produce (symbolised by reference arrow a in FIG. 3) an electronic signature for all or part of the contents of its memories COMEM. Said electronic signature constitutes a digital integrity certificate AN for the corresponding signed content, and its authenticity can be verified using the public key CPU1 of the first pair of keys CC1.

Figure 4:
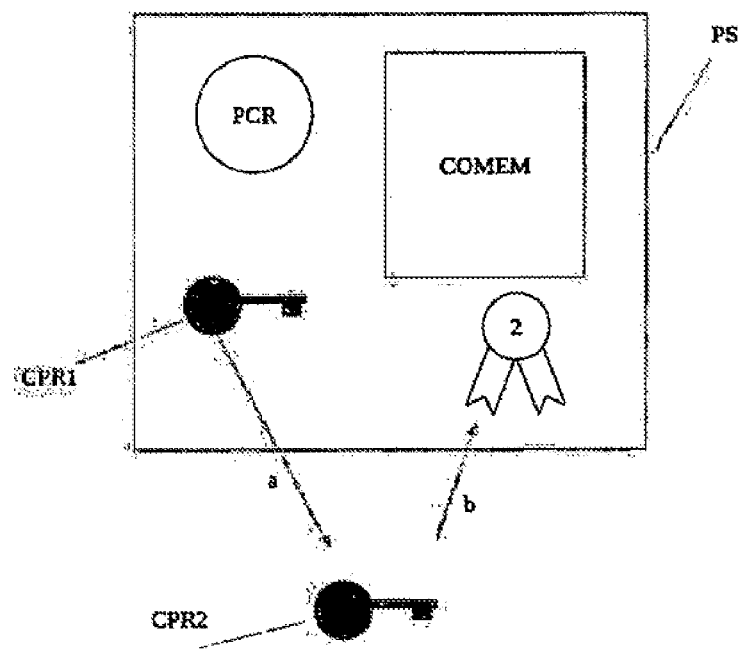
FIG. 4 is a simplified diagram illustrating an example of an embodiment with a second pair of asymmetric cryptographic keys.

Furthermore, (see diagram in FIG. 4), the cooperating entities EC jointly agree on a second pair of asymmetric cryptographic keys CC2. Then, the private key CPR2 of the second pair of keys CC2 is used to produce the electronic signature for the public key CPU1 of the first pairs of keys CC1 of each security processor PS, previously mentioned. As such, the cooperating entities EC are able to authenticate, using the public key CPU2 of the second pair of keys CC2, the digital integrity certificates AN issued by each of the security processors PS. In FIG. 4, reference arrow a symbolises the extraction of the public key CPU1 from the first pair of keys CC1, and reference arrow b symbolises the signing, by the private key CPR2 belonging to the second pair of keys CC2, of the public key CPU1 belonging to the first pair of keys CC1.

Two embodiments can be envisioned such that the cooperating entities EC agree on a second pair of asymmetric cryptographic keys CC2. In one embodiment (see diagram of FIG. 5), the cooperating entities EC use a pair of asymmetric cryptographic keys drawn at random and shared between them. In another embodiment (see diagram of FIG. 6), the second pair of asymmetric cryptographic keys CC2 belongs to an external certification authority. These two embodiments are not exclusive of other different ones known or achievable by those skilled in the art and providing similar results.

Figure 5:
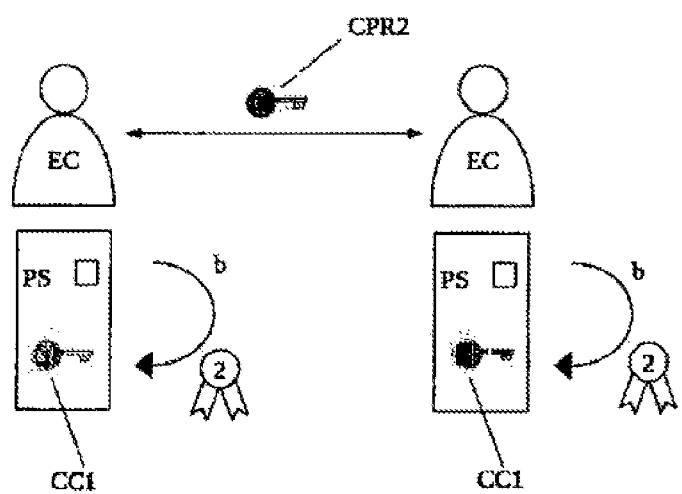
FIGS. 5 and 6 are two simplified diagrams illustrating two examples of embodiments such that the cooperating entities agree on a second pair of asymmetric cryptographic keys, namely an implementation with a random draw and an implementation involving an external certification authority.

In FIG. 5, reference arrow a symbolises the random selection and sharing of the private key CPR2 of the second pair of keys CC2 and reference arrow b symbolises the implementation of the private key CPR2 of the second pair of keys CC2 to provide the electronic signature of the public key CPR1 of the first pair of keys CC1.

Figure 6:
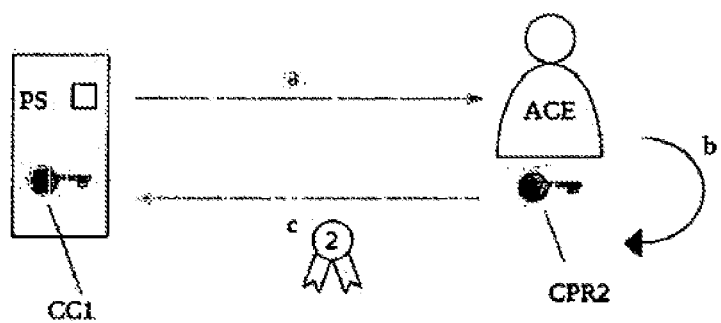

In FIG. 6, reference arrow a symbolises the provision of the public key CPU1 belonging to the first pair of keys CC1 to the external certification authority ACE, reference arrow b symbolises the implementation of the private key CPR2 of the second key pair CC2 belonging to the external certification authority ACE, to sign the public key CPU1 of the first key pair CC1 (creation of the digital certificate AN), and reference arrow c symbolises the return of the electronic signature of public key CPU1 belonging to the first pair of keys CC1 by the private key CPR2 of the second pair of keys CC2, in order to store it in the security processor PS.

In addition to the application AP integrity verification method, the validation method also includes a process whereby cooperating entities EC create a common secret SC and thereby constitute a college of cooperating creative entities COECC.

Figure 7:
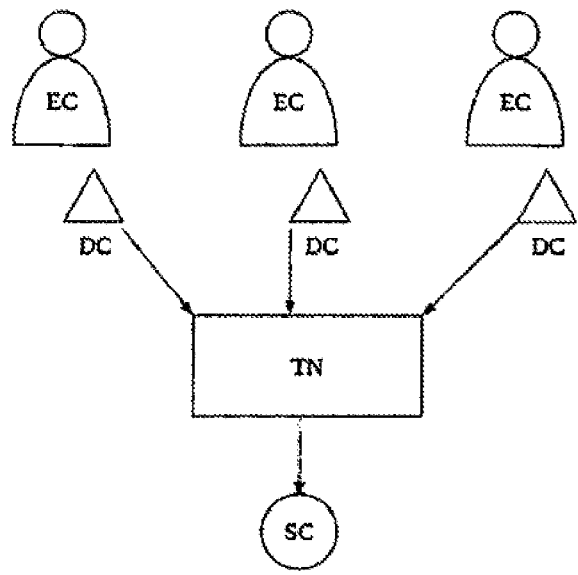
FIG. 7 is a simplified diagram showing how cooperating entities pool their proprietary confidential data and how digital processing is applied to the entirety in order to create a common secret.

For this purpose, and in one embodiment (see diagram in FIG. 7), cooperating entities EC pool proprietary confidential data DC and digital processing TN is applied to all of said proprietary confidential data DC in order to create the common secret SC.

Figure 8B:
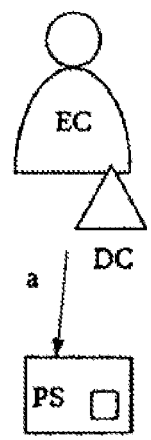
FIG. 8*b* is a diagram illustrating another embodiment in which the specific confidential data are introduced by the cooperating entities into the memories of the associated security processors.
Figure 8A:
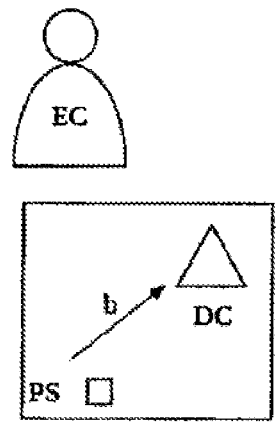
FIG. 8*a* is a simplified diagram illustrating an embodiment in which the proprietary confidential data are drawn at random by each of the cooperating entities.

Several embodiments can be envisaged regarding the confidential data DC. In one embodiment (see FIG. 8a), the reference arrow b in this figure symbolises the proprietary confidential data DDC, which are drawn at random by each of the cooperating entities. In another embodiment (see FIG. 8b), reference arrow a in this figure symbolises the proprietary confidential data DC which are introduced by the cooperating entities EC into the memory of the associated security processors PS. In another embodiment, the proprietary confidential data DC are extracted from the memory of the associated security processors PS. These embodiments could be combined. The different embodiments do not exclude other different ones, known or achievable by those skilled in the art, and providing similar results.

Figure 9:
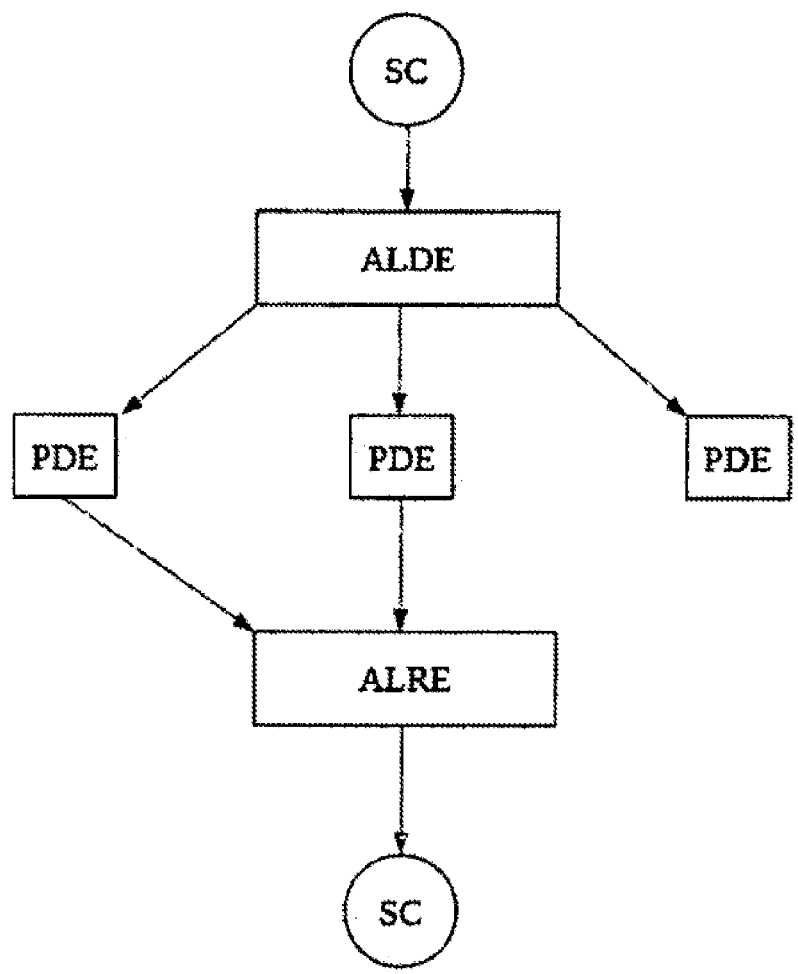
FIG. 9 is a simplified diagram illustrating that, by means of a splitting/reconstruction algorithm, the common secret is split into separate parts and subsequently reconstructed.

As is illustrated in FIG. 9, it is expected that, by means of a splitting/reconstruction algorithm ALDE/ALRE, the common secret SC is able to be split into separate parts PDE in such a way that it can be reconstructed later on.

In FIG. 9, reference arrow a symbolises splitting and reference arrow b symbolises reconstruction.

According to the embodiment shown in FIG. 9, reconstitution of the common secret SC can be done on the basis of, not all of the separate parts PDE, but only some of them, which are then suitable and sufficient to subsequently reconstruct said common secret SC. According to another embodiment, all the separate parts PDE are required to subsequently reconstruct the common secret SC.

According to one embodiment, the common secret SC is split into separate parts PDE several successive times. In this case, according to one embodiment, and for security purposes, the common secret SC can then only be reconstructed from separate parts PDE coming from the same split, and not from separate parts PDE coming from several splits.

Figure 10:
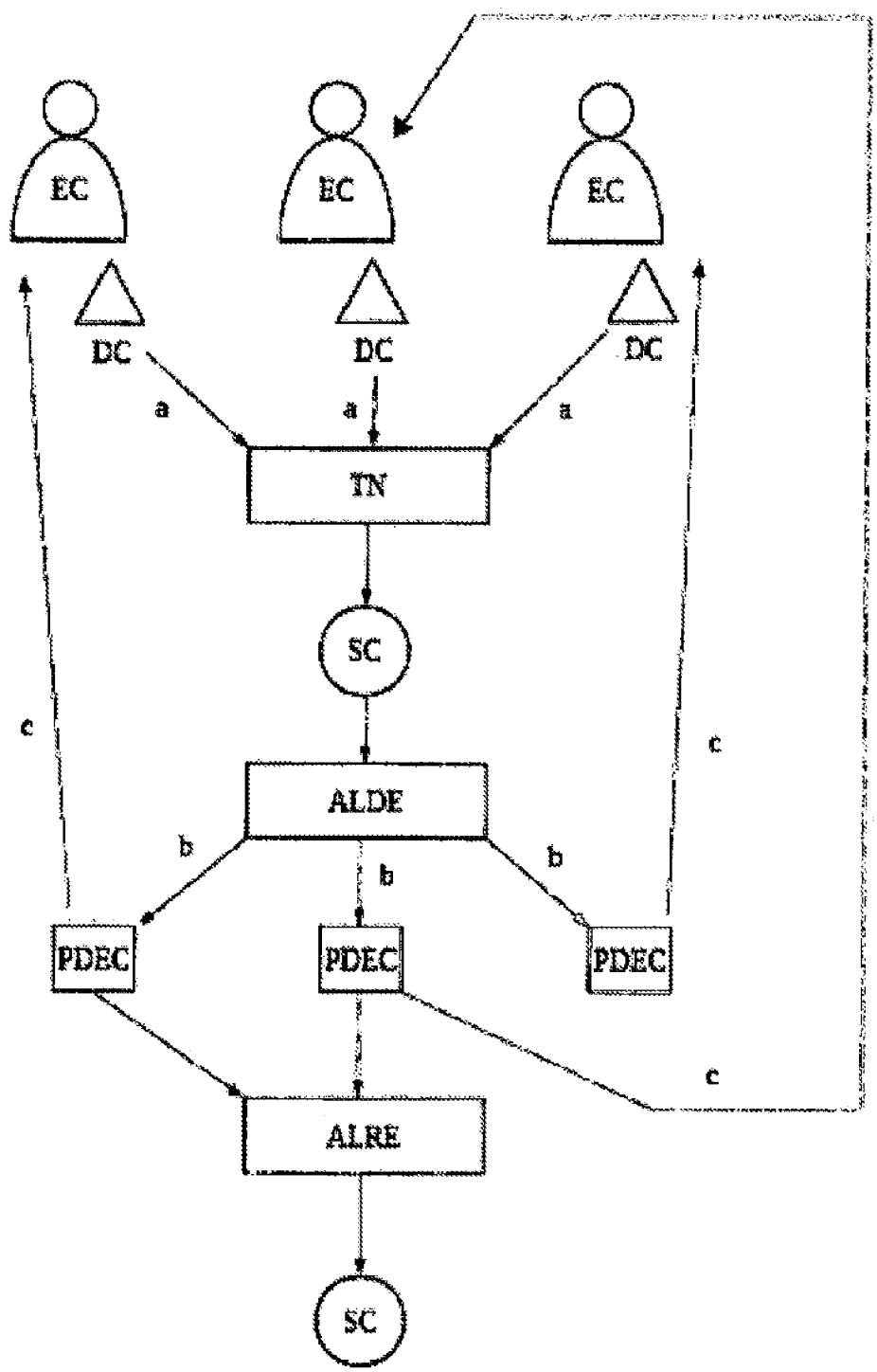
FIG. 10 is a simplified diagram illustrating the pooling and digital processing of proprietary confidential data in order to create a common secret, followed by splitting by means of a splitting algorithm and distribution among the cooperating entities, followed by reconstruction by means of a reconstruction algorithm.

According to the embodiment shown in FIG. 10, cooperating entities EC pool their own confidential data DC (which is symbolised by reference arrow a in FIG. 10), digital processing TN is applied to all of said proprietary confidential data DC in order to create the common secret SC, as previously explained. Then, the resulting common secret SC is split into a number of creative separate parts PDEC equal to the number of cooperating creative entities ECC constituting a college COECC, by means of a splitting algorithm ALDE (symbolised by reference arrow b in FIG. 10). The separate creative parts PDEC are then distributed among the cooperating creative entities ECC, each of which retains one of the separate creative parts PDEC (symbolised by reference arrow c in FIG. 10). Then, by means of a reconstruction algorithm ALRE, the common secret SC is reconstructed using at least some (two out of three in the case in FIG. 10) of the separate creative parts PDEC. Or, in one embodiment, the common secret SC is reconstructed using all the separate creative parts PDEC.

According to one possibility intended to provide more security, the common secret SC can only be used for the validation of one, and only one, digital request RN, and it cannot be stored persistently in any of the memories of the associated security processors PS.

Two possible embodiments can be envisaged with regard to the integrity verification method of the application AP such that, using the digital certificates AN issued by each security processor PS, each cooperating entity EC ensures that each of the others cooperating entities EC implements an application AP identical to its own, by cryptographically verifying the corresponding digital certificate AN.

Figure 11:
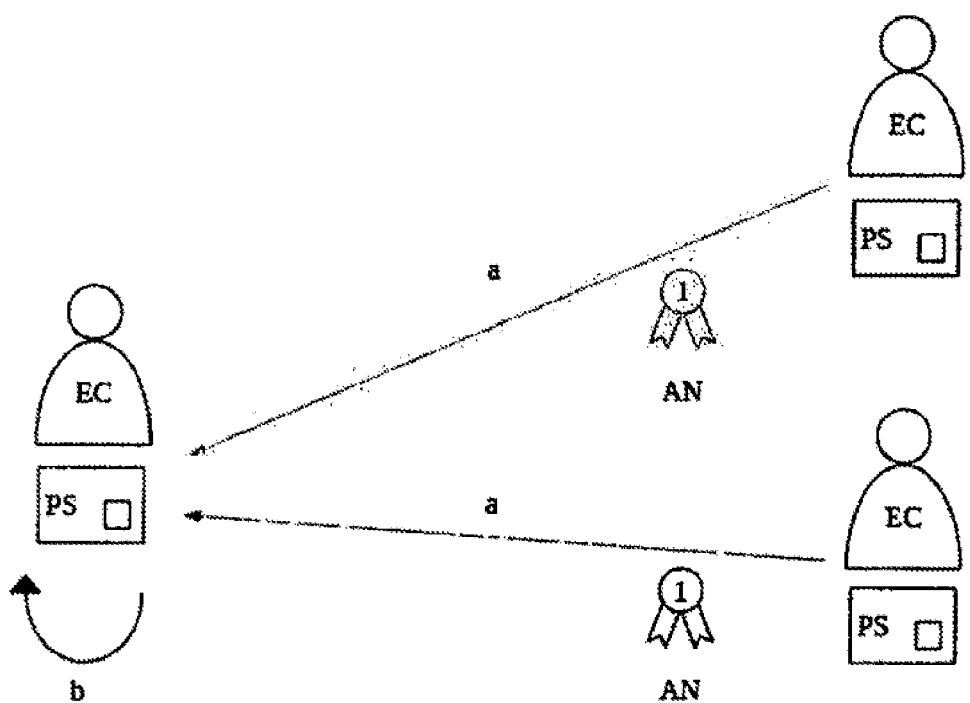
FIGS. 11 and 12 are two simplified diagrams illustrating two possible examples of implementation relating to the application integrity verification process, i.e., direct verification (FIG. 11) and indirect verification by transitivity (FIG. 12).

According to a first possible embodiment illustrated in FIG. 11, each cooperating entity EC ensures this itself. FIG. 11 shows three cooperating entities EC and three security processors PS with applications AP. The two reference arrows a in FIG. 11 symbolise the issue, by two cooperating entities EC to the third cooperating entity EC, of certificates AN for their own applications AP. Reference arrow b in FIG. 11 symbolises verification, by the third cooperating entity EC, that the applications of the first two cooperating entities EC are identical to its own. Direct verification therefore takes place.

Figure 12:
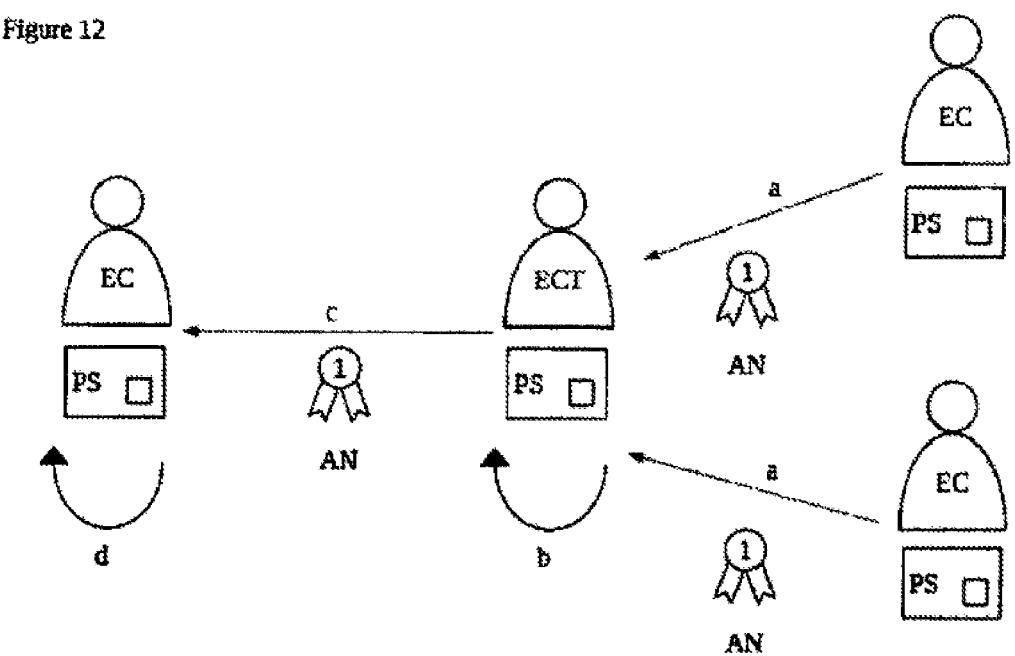

According to a second possible embodiment illustrated in FIG. 12, each cooperating entity EC ensures that each of the other cooperating entities EC implements an application AP identical to its own by cryptographically verifying the corresponding digital certificate AN, not directly as in the first embodiment, but indirectly and by transitivity, ensuring that a certain cooperating entity ECT implements an application AP identical to its own by cryptographically verifying the corresponding digital certificate AN, said certain cooperating entity ECT having itself ensured that the other cooperating entities EC are implementing the same application AP. FIG. 12 shows four cooperating entities EC, including the certain entity ECT, and four security processors PS with applications AP.

The two reference arrows a in FIG. 12 symbolise the issue, by two cooperating entities EC to the certain cooperating entity ECT, certificates AN for their own applications AP. Reference arrow b in FIG. 12 symbolises verification, by said certain cooperating entity ECT, that the applications AP of the first two cooperating entities EC are identical to its own. Reference arrow c in FIG. 12 symbolises the issue, by the certain cooperating entity ECT to the fourth cooperating entity EC, of a certificate AN for its own application AP, which is identical to those of the first two cooperating entities EC. And finally, reference arrow d in FIG. 12 symbolises verification, by said fourth cooperating entity EC, that the application AP of the certain cooperating entity ECT, and therefore transitively the application AP of the first two cooperating entities EC, are identical to its own. Indirect verification therefore takes place in this case.

According to one possibility intended to improve security, the proprietary confidential data DC is sent, in a confidential manner, by means of an encryption and decryption algorithm, between the cooperating creative entities ECC, using at least one session key, said session key being rendered unusable after the common secret SC has been created.

Likewise, separate parts PDE resulting from the same split of the common secret SC are sent confidentially, by means of an encryption and decryption algorithm, between the cooperating entities EC using at least one session key, said session key being rendered unusable after the reconstruction of said common secret SC.

According to one possible embodiment, the cooperating creative entities ECC comprise a primary controller creative entity ECCP1 and the other cooperating creative entities ECCA1.

A plurality of session keys are used, such that each cooperating creative entity ECC uses its proprietary key to communicate confidentially, by means of an encryption and decryption algorithm ALCD, with the primary controller creative entity ECCP1. The AP application incorporates a session key exchange algorithm, ALEC. And, the primary controller creative entity ECCP1 initiates the session key exchange algorithm ALEC with each of the other cooperating creative entities ECCA1.

In doing so, the other cooperating creative entities ECCA1 send, in a confidential manner using their own session key, using a one-time encryption and decryption algorithm ALCD, their own confidential data DC to the primary controller creative entity ECCP1.

As the process is repeated, each cooperative creative entity becomes the primary controller creative entity ECCP1, The cooperating creative entities ECC are then able to apply digital processing to all the propriety confidential data DC, so creating the common secret SC.

According to another possible embodiment, the cooperating creative entities ECC include a secondary controller creative entity ECCP2 and the other cooperating creative entities ECCA2.

A plurality of session keys are used, such that each cooperating signatory entity ECS uses its proprietary key to communicate confidentially, by means of an encryption and decryption algorithm ALCD, with the secondary controller creative entity ECCP2.

A plurality of session keys are also used, such that each cooperating creative entity ECC uses its proprietary key to communicate confidentially, by means of an encryption and decryption algorithm ALCD, with the secondary controller creative entity ECCP2.

The secondary controller creative entity ECCP2 implements a process for verifying the integrity of the application AP in the security processor PS of each cooperating signatory entity ECS, such that the secondary controller creative entity ECCP2 ensures that each of the cooperating signatory entities ECS implements an application AP which is identical to its own, by cryptographically verifying the corresponding digital certificate AN.

The application AP incorporates a session key exchange algorithm ALEC. Then, the session key exchange algorithm ALEC is initiated, on the one hand, between each of the other cooperating creative entities ECCA2 and each of the cooperating signatory entities ECS and, on the other, the secondary controller creative entity ECCP2.

As such, all, or at least some (in sufficient number for the reconstruction of the common secret SC) of the other cooperating creative entities ECCA2 send, in a confidential manner using their own session keys, by means of a one-time encryption and decryption algorithm ALCD, the separate creative parts PDEC resulting from the same split of the common secret SC, to the secondary controller creative entity ECCP2.

The secondary controller creative entity ECCP2 then reconstructs the common secret SC.

The secondary controller creative entity ECCP2 splits the common secret SC into a number of separate signatory parts PDES equal to the number of cooperating signatory entities ES.

The secondary controller creative entity ECCP2 sends, in a confidential manner using the session keys, by means of a one-time encryption and decryption algorithm ALCD, their separate signatory parts PDES of the common secret SC to the cooperating signatory entities ECS.

According to one possible embodiment, the cooperating entities EC include a controller entity ECP and the other cooperating entities ECA. A plurality of session keys are used, such that each cooperating entity EC implements its own key to communicate confidentially, by means of an encryption and decryption algorithm ALCD, with the pilot entity ECP. The application AP incorporates a session key exchange algorithm ALEC. The controller entity ECP initiates the session key exchange algorithm ALEC with each of the other cooperating entities EC. As such, all, or at least some (in sufficient number for the reconstruction of the common secret SC) of the other cooperating entities ECA send, confidentially using their own session key, by means of a one-time encryption and decryption algorithm ALCD, the split parts PDE resulting from the same split of the common secret SC, to the controller entity ECP.

As is described above, the validation method comprises, through the implementation of the method for verifying the integrity of the application AP, a process whereby the entities ECC of the college of cooperating creative entities COECC designate the cooperating signatory entities ES, so constituting a college of cooperating signatory entities COECS. This college of cooperating signatory entities COECS, taken as such, has access to the common secret SC.

Lastly, the request RN is validated if, and only if, the cooperating entities ECS of the college of cooperating signatory entities COECS implement the application AP using the common secret SC. Depending on the case, this will be either all the cooperating signatory entities or just a quorum of the college of cooperating signatory entities COECS.

Depending on the case, the college of cooperating creative entities COECC and the college of cooperating signatory entities COECS are different, or the college of cooperating creative entities COECC and the college of cooperating signatory entities COECS are at least partially the same.

The invention claimed is:

1. A method for validating a digital request by a plurality of cooperating entities, each of said plurality of cooperating entities are having a corresponding security processor of a plurality of security processors configured to execute an application that is required to process said digital request, and to issue, upon request, a digital integrity certificate of said application, the method comprising:
   each of said plurality of cooperating entities, ensuring that all other of said plurality of cooperating entities are configured to execute said application by cryptographically verifying the digital integrity certificates issued by the security processors of each of said all other of said plurality of cooperating entities;
   at least two of said plurality of cooperating entities, creating a common secret, wherein said at least two of said plurality of cooperating entities creating said common secret constitute a college of cooperating creative entities, wherein said common secret is created by:
   transmitting between entities of said college of cooperating creative entities proprietary confidential data using an encryption and decryption algorithm and at least one session key; and
   pooling said proprietary confidential data and applying digital processing to said proprietary confidential data,
   wherein said college of cooperating creative entities are designating cooperating signatory entities that constitute a college of cooperating signatory entities, the college of cooperating signatory entities having access to said common secret; and
   validating the digital request by the cooperating signatory entities using said common secret;
   the method further comprising, with a splitting and reconstruction algorithm:
   dividing said common secret into a number of separate parts equal to a number of the entities in said college of cooperating creative entities;
   distributing each of said separate parts to a corresponding one of said entities of said college of cooperating creative entities; and
   reconstructing subsequently said common secret by using at least some of said separate parts.

2. The method of claim 1, wherein
each security processor of each of the plurality of cooperating entities has a memory and is provided with a first pair of asymmetric cryptographic keys comprising a first private key and a first public key, the method further comprising:
using the first private key to produce an electronic signature of all or part of a content of said memory of each security processor of each of the plurality of cooperating entities, which authenticity is verifiable using said first public key.

3. The method of claim 2, wherein:
the plurality of cooperating entities jointly agree on a second pair of asymmetric cryptographic keys, comprising a second private key and a second public key;
the second private key is used to produce an electronic signature of the first public key of each security processor; and
based on the second public key, each of the plurality of cooperating entities authenticate the digital integrity certificate issued by the security processor of all other of the plurality of cooperating entities.

4. The method of claim 3, wherein said second pair of asymmetric cryptographic keys is randomly drawn.

5. The method of claim 3, wherein said second pair of asymmetric cryptographic keys is from an external certification authority.

6. The method of claim 1, wherein said proprietary confidential data is randomly drawn by the plurality of cooperating entities.

7. The method of claim 1, whereby said common secret is used for validation of only one digital request and is not stored persistently in any of the memories of the security processors.

8. The method of claim 1, wherein each entity of the plurality of cooperating entities ensures that each other entity of the plurality of cooperating entities implements said application by directly cryptographically verifying the digital integrity certificate of each other entity of the plurality of cooperating entities.

9. The method of claim 1, wherein one entity of the plurality of cooperating entities ensures that a first entity of the plurality of cooperating entities implements said application by cryptographically verifying the digital integrity certificate, of a second entity of the plurality of cooperating entities which has cryptographically verified the digital integrity certificate of the first entity of the plurality of cooperating entities.

10. The method of claim 1, wherein the college of cooperating creative entities and the college of cooperating signatory entities are different.

* * * * *